United States Patent [19]

Guthrie

[11] Patent Number: 4,787,794
[45] Date of Patent: * Nov. 29, 1988

[54] DRILL PRESS WITH QUICK ADJUSTING STOP NUT ASSEMBLY

[75] Inventor: Gerald Guthrie, Stillwater, Minn.

[73] Assignee: 5W Enterprises, Inc., Stillwater, Minn.

[*] Notice: The portion of the term of this patent subsequent to Sep. 15, 2004 has been disclaimed.

[21] Appl. No.: 96,512

[22] Filed: Sep. 11, 1987

Related U.S. Application Data

[63] Continuation of Ser. No. 528,576, Sep. 1, 1983, Pat. No. 4,693,656.

[51] Int. Cl.⁴ ............................................. F16B 37/08
[52] U.S. Cl. .................................. 411/433; 269/181; 408/16
[58] Field of Search ................ 411/432, 433, 437; 269/180, 181, 184, 182; 408/16, 241 S

[56] References Cited

U.S. PATENT DOCUMENTS 3,570,836  3/1971  Pettavel .............................. 269/181

FOREIGN PATENT DOCUMENTS 994271  6/1965  United Kingdom ................ 269/181

Primary Examiner—Neill R. Wilson
Attorney, Agent, or Firm—William L. Huebsch

[57] ABSTRACT

A quick adjusting quill nut having a body with an axial bore therethrough for receiving a threaded shaft and a transverse bore communicating with the axial bore. A button element is disposed in the axial bore, having a transverse aperture therethrough in general registry with the body axial bore, also adapted to receive the shaft. The aperture is formed of offset bores of differing diameters; the larger bore is of a diameter greater than that of the shaft, and the smaller bore is threaded and of a diameter corresponding to that of the shaft. A spring biasing is provided to maintain the threaded bore in threaded engagement with the shaft. The exterior body of the nut is knurled and is marked with precision graduations.

4 Claims, 2 Drawing Sheets

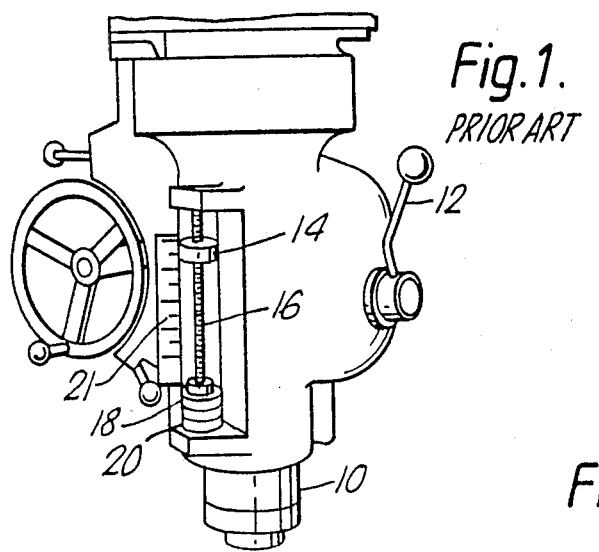
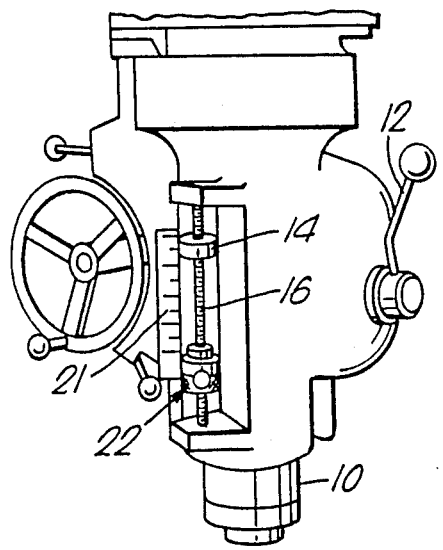
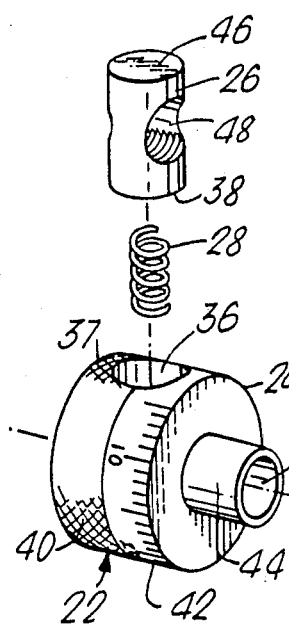
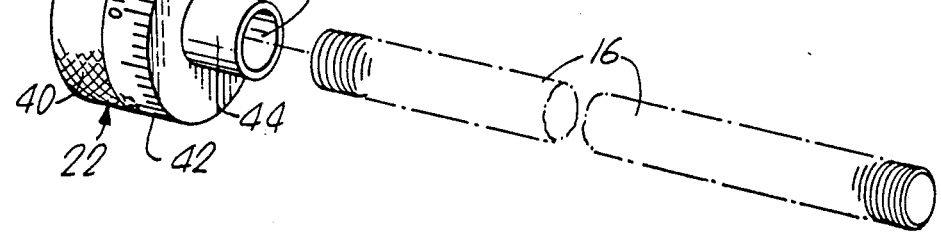

DRILL PRESS WITH QUICK ADJUSTING STOP NUT ASSEMBLY

This is a continuation of application Ser. No. 528,576 filed Sept. 1, 1983, now U.S. Pat. No. 4,693,656.

BACKGROUND OF THE INVENTION

The present invention relates to an improved quick adjustment nut, and in particular to a quick release stop and guide for use on drilling, depth milling and other machinery.

In general, stops and guides for use on drilling, depth milling and other similar machinery are known. For example, a portion of a commercially available "Bridgeport" vertical milling machine is shown in FIG. 1. A quill 10 is associated reciprocated in accordance with manual control by handle 12 within prescribed limits defined by a stop nut 18 and lock nut 20. Stop nut 18 and lock nut 20 are threadedly mounted on a length threaded shaft 16 attached to the milling machine. A solid quill stop 14 is coupled to (and moves with) quill 10. The respective nuts cooperate to regulate the drilling and milling depth setting of the quill in a manner well known to machine shop operators.

However, quill 10 has a travel range of on the order of five inches and a depth stop may be required at any point along this range. Accordingly, in the past much time has been wasted in manually threading the movable nuts up and down the threaded rod. The latter operation is especially time consuming and irritating when the threads are dirty and while the operator is engaged in producing short-run lots of work, each requiring a different stopping position of the movable nuts on the shaft. Often, because of this inconvenience, the operator will not use the movable nuts, preferring instead to sight depth by eye with the aid of the five-inch scale 21 attached to the machine. In addition, the stop nuts typically do not include any graduation to facilitate precision adjustment, and even when the stop nuts are used in short-run lots, operators tend to adjust the nuts merely by sight, rather than accurately measuring the depth of the quill. The result is thus less accurate work than would be the case if the stop and lock nuts were used properly.

Quick release nuts which provide for selective sliding or threading motion with respect to a threaded shaft are known. An example of such a nut is described in U.S. Pat. No. 422,361 issued to G. H. Alton on Mar. 4, 1890. The Alton nut is formed of a body including an axial bore therethrough, and a transverse bore communicating with the axial bore. A thumb piece, including a transverse bore, is received in the body transverse bore such that the thumb piece transverse bore is in general registry with the body axial bore. The thumb piece bore (and body axial bore) are of a constant diameter sufficiently larger than the diameter of the threaded shaft with which the nut is to cooperate, to permit reception of the threaded shaft with a considerable space allowed for play. A portion of the interior of the thumb piece bore is threaded in a manner suitable for engagement with the threads of the shaft and the thumb piece is spring biased to bring the threaded portion into engagement with the shaft threads. Depressing the thumb piece against the spring bias, disengages the threaded portion of the thumb piece bore from the threaded shaft, and the play in the bore diameter permits sliding of the nut with respect to the shaft. However, the use of a thumb piece bore of a constant diameter significantly larger than the diameter of the shaft, effects only a relatively small threaded engagement (significantly less than 180 degrees) between the shaft perimeter and nut Accordingly, the nut is relatively susceptible to spurious disengagement or movement due to, for example, vibration of the threaded shaft or unintentional physical contact on the nut by an operator. Moreover, the thumb piece of such nuts commonly protrude from the nut body to such an extent that the relative position of the threaded shaft and body of a conventional milling machine would preclude motion of the nut. Moreover, no gradations are provided to facilitate fine adjustment. Thus, such prior art quick release nuts do not provide sufficient precision or stability for use with, for example, a conventional milling machine.

Attempts have been made to provide nuts which can be easily, quickly and accurately set to selected locations on threaded rods associated with milling machines Examples are disclosed in U.S. Pat. Nos. 3,431,623 issued Mar. 11, 1969 to G. G. F. Smeets and 4,084,897 issued Sept. 20, 1977 to E. E. Price, Jr. However, such prior art releasable nuts are subject to a number of serious disadvantages. The devices are relatively complex and expensive to manufacture. Moreover, internal portions of the nuts tend to be exposed and are thereby subject to jamming due to the accumulation of metal chips lodging in the exposed portions Moreover, the nuts lack precision adjusting graduations.

SUMMARY OF THE INVENTION

The present invention provides an efficient quick adjusting nut for selective sliding coarse adjustment or rotational precision fine adjustment suitable for rotatable engagement with a shaft in close tolerances and which provides stable precision engagement with the shaft to obviate the disadvantages associated with heretofore known device.

BRIEF DESCRIPTION OF THE DRAWING

A preferred exemplary embodiment of the present invention will hereinafter be described in conjunction with the appended drawing wherein like designations denote like elements and:

FIG. 1 is a perspective view of a prior art manually operated two-nut system on a conventional milling machine;

FIG. 2 is a perspective of the present invention on a threaded shaft mounted on a conventional milling machine;

FIG. 3 is an exploded perspective view of the three basic elements, of the present invention in relationship to a threaded shaft upon which the assembled elements are mounted;

DETAILED DESCRIPTION OF THE INVENTION

Referring now to FIG. 3, a quick adjusting nut 22 in accordance with the present invention includes a nut body 24, a depressable button element 26, and a biasing mechanism, such as a compression spring 28.

Figure 4:
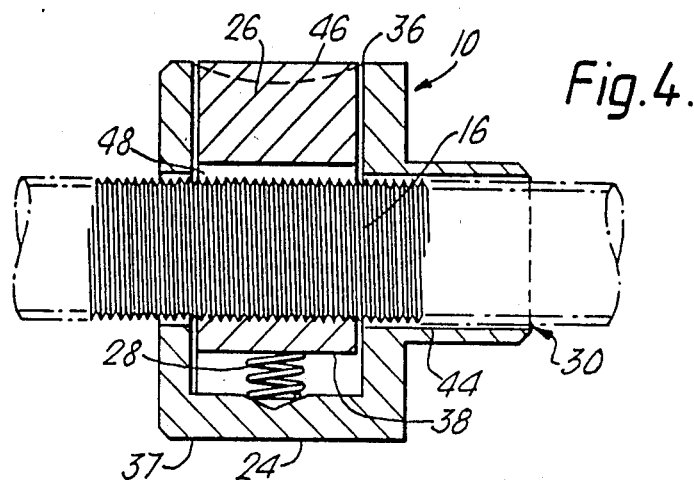
FIG. 4 is a cross-sectional view of a quick-adjusting nut assembly in accordance with the present invention in a releasably locked position on a threaded shaft.
Figure 5:
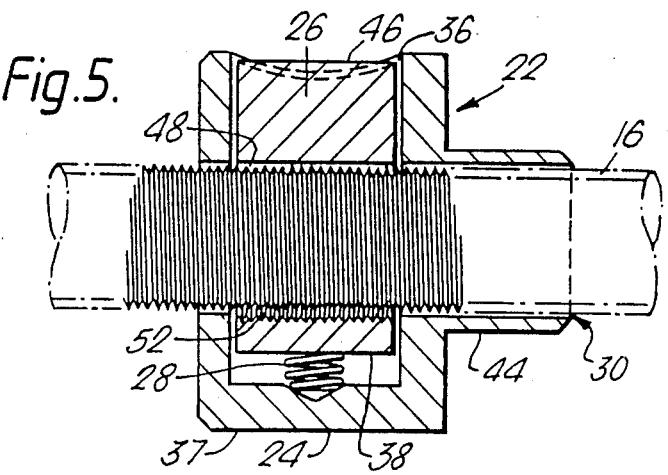
FIG. 5 is a cross-sectional view of a quick-adjusting nut assembly in accordance with the present invention in the released position.

As best seen in FIGS. 3-5, nut body 24 includes an axial bore or passageway 30 therethrough adapted for receiving threaded shaft 16. Axial bore 30 is suitably centrally located through body 24. In addition, as best seen in FIGS. 4 and 5, a transverse bore or pocket 36 extends radially inward from one exterior point across the diameter of nut body 24 communicating with axial bore 30 and terminates at a point 38 in the opposite half of body 24.

In greater detail, for use with a conventional milling machine, utilizing a ½-20 threaded shaft 16, nut body 24 may be machined from 1.5 inch bar or rod stock and tooled to the general configuration illustrated in FIG. 3. Nut body 24 may be approximately 1.44 inches long from top to bottom. The preferred embodiment of nut body 24 includes a knurled end portion 40 having a 0.3 by 45 degree chamfered edge. Knurled portion 40 preferably extends approximately 0.50 inch in an axial direction and is of 1.5 inches diameter Nut body 24 is also provided with an upper graduated portion 42, including on the order of fifty precision graduations (not all shown in FIG. 3). Graduated portion 42 is suitably of slightly lesser diameter than knurled portion 42 (have a cross-sectional diameter of about 1.46 to 1.48 inches). Graduations are suitably stamped in the graduated portion 42 to a minimum depth of 0.20 inch from the nut surface. As illustrated in FIG. 3, the graduations are marked in individual units as in a conventional ruler or micrometer. The axial length of graduation portion 42 is suitably about 0.45 inch.

A centrally disposed axially extending sleeve portion 44, suitably having an external cross-sectional diameter of about 0.66 inch, extends outwardly from the upper end of body graduation portion 42.

Axial bore 30 is suitably centrally disposed, extending through each of sleeve portion 44, graduation portion 42 and knurled portion 40 of nut body 24. The diameter of axial bore 30 is chosen to closely receive rod 16, permitting sliding in an axial direction, but relatively little lateral motion.

Referring now to FIGS. 3-7, button element or plunger 26 is adapted to be slidably received in nut body transverse bore 36, with a first outer end 46, disposed to be accessible from the body exterior. First end 46 is suitably contoured in general accordance with the shape of outer surface of nut body 24.

Figure 6:
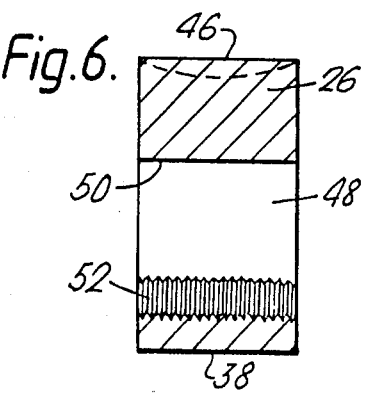
FIG. 6 is a partial transverse cross section of a portion of the button element showing the transverse bore therethrough, the large face of the bore, and the smaller thread face of the bore.
Figure 7:
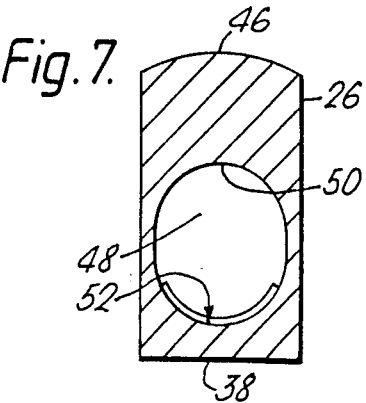
FIG. 7 is a cross-sectional view of a button element in accordance with the present invention showing the larger face and the smaller threaded face of the transverse bore.

As best seen in FIGS. 6 and 7, button element 26 includes a transverse aperture 48 defined by two slightly offset bores 50 and 52. Bore 50 is disposed nearest first end 46 of button 26. Bore 50 is of a larger diameter than bore 52, suitably of slightly larger diameter than nut body axial bore 30 (e.g., 0.505 to 0.510 inch diameter. Smaller bore 52 is suitably offset from bore 50 by approximately 0.085 to 0.075 inch, and is of a diameter commensurate with that of threaded shaft 16 (e.g., 0.50 inch), and is threaded (20 threads per inch, female) in a manner suitable for threaded engagement or mating with the threads of shaft 16.

Referring now to FIGS. 3-5, button 26 is received in nut body transverse bore 36 such that aperture 48 is disposed in general registry with nut body axial shaft 30. Nut body axial shaft 30 and button aperture 48, are adapted to cooperatively receive threaded rod 16, as will be explained. Biasing means or spring 28 is placed in the terminal end 38 of nut body transverse bore 36 so that the compressive spring forces will operate parallel to nut body transverse bore 36 and, as will be explained, in the absence of external compressive force, spring bias threaded bore 52 into threaded engagement with shaft 16.

The quick adjusting nut 22 is easily placed in an operative condition in respect of a rod 16 on a conventional milling machine. Threaded rod 16 is temporarily removed from the milling machine and the conventional stop nut (not shown in FIG. 2) threadably engaged on rod 16 is unscrewed. Button 26 is then depressed, and the nut 22 is mounted onto threaded rod 16 by sliding rod 16 through nut body axial bore 30 and button aperture 48. Rod 16 is then remounted on the milling machine.

Coarse positioning nut 22 is quickly and efficiently achieved by depressing release button 26 and axially sliding nut 22 to the approximate location on rod 16, as determined by visual coordination with machine mounted scale 21. More particularly, depressing button 26 inward radial direction compressed spring 28, displaces button aperture 48 from the spring biased (engaged) position with respect to rod 16. Rod 16 is thus disengaged from threaded bore 52 and is received in the larger diameter bore 50 of button aperture 48 to permit the axial sliding of nut 22 with respect to the threaded rod (shaft) 16. Button 26 is then released, to resume the spring biased (engaged) relation whereby spring 28 biases the smaller threaded bore 52 of the button aperture 48 into threaded engagement with the threads of shaft 16.

A secure threaded engagement between nut 22 and shaft 16 is provided by use of a button aperture 48 formed with offset bores 50 and 52 of differing diameters. By using a smaller threaded bore of a diameter corresponding to that of shaft 16, nearly a full 180 degrees of threaded engagement between nut 22 and shaft 16 is provided under bias by spring 28. Further, the relatively close reception of shaft 16 by nut axial bore 30, and the extended length of axial bore afforded by sleeve 44 also help to effectuate a secure threaded engagement. The close reception of rod 16 by axial bore 30, and sleeve 44 also tends to prevent wobble during rotation of nut 22 for precision adjustment (or sliding adjustment) and mitigates against the generation of any oblique (non-axial) forces acting on button 26 during quick sliding adjustment.

Precision adjustment is achieved by rotating the nut 22 about rod 16 as desired, and is facilitated by graduation portion 42 of nut body 24. In the preferred embodiment with fifty evenly spaced graduations about the circumference of a 1.460 to 1.480 inches diameter graduation portion 42, precision adjustments to within 0.001 inch can be achieved by rotating nut 22 one graduation.

It should be appreciated that the present invention provides a particularly useful device. For example, when used in a machine shop wherein about 20 quick stop adjustments are required per day, a nut 22 in accordance with the present invention will save, on average, about 8 man hours per month, as compared to conventional adjustment mechanisms. Further, a secure engagement between nut 22 and shaft 16 is provided, not susceptible to undesired slippage due to vibration, etc., or to jamming.

It will be understood that the above description is of a preferred exemplary embodiment of the present invention, and that the invention is not limited to the specific forms shown. Modifications may be made in the design and arrangement of the elements without departing from the spirit of the invention as expressed in the appended claims. In addition, it should be understood that the present invention, while described in connection with milling machines, has advantageous application with other machines such as drill presses and the like.

What is claimed is:

1. A drill press comprising a drill stop and a cylindrical threaded shaft having a predetermined major diameter, said drill stop and cylindrical threaded shaft being mounted to afford relative movement therebetween with said drill stop along the periphery of said shaft, and a stop nut assembly adjustably mounted on said shaft and adapted for engagement by said drill stop to limit relative movement between said drill stop and said shaft, said stop nut assembly comprising:
    a body having a generally cylindrical peripheral surface portion, having a through axial passageway including cylindrical portions slightly larger than the major diameter of the shaft to closely receive the shaft while affording free movement of the body axially along the shaft, and having a cylindrical transverse socket extending generally radially into said body, said transverse socket intersecting said axial passageway and opening through the periphery of said body;
    a cylindrical plunger disposed in said socket, said plunger having an outer end manually accessible from the periphery of said body, an inner end portion disposed within said body, and an axis extending between said outer end and end portion, said plunger also having a transverse through aperture which has an inner portion partially defined by threads adjacent the inner end portion of said plunger adapted for engagement with the threads of the shaft, and has an outer portion adjacent the outer end of said plunger affording free transverse movement of the plunger axially along the shaft, said plunger being movable within said socket between a released position with the outer portion of said aperture aligned with said passageway to afford axial movement of said nut assembly along the shaft, to an engaged position with the threads on said plunger engaging with the threads on the shaft; and
    biasing means between the said plunger and said body for biasing said plunger to said engaged position;
    said aperture being elongate axially of the plunger and said threads adjacent the inner end of said plunger being adapted for engagement with the threads on the shaft to lock said nut assembly against longitudinal movement on the shaft without relative rotation therebetween when said plunger is moved to said engaged position under the influence of said biasing means.

2. A drill press according to claim 1 wherein said outer end of said plunger is generally aligned with said peripheral surface portion of said body when the plunger is in said engaged position.

3. A drill press comprising a drill stop and a cylindrical threaded shaft having a predetermined major diameter, said drill stop and shaft being mounted to afford relative movement therebetween with said drill stop along the periphery of said shaft, and a stop nut assembly adjustably mounted on said shaft and adapted for engagement by said drill stop to limit relative movement between said drill stop and said shaft, said stop nut assembly comprising:
    a body having a generally cylindrical peripheral surface portion, having a through axial passageway slightly larger than the major diameter of the shaft to closely receive the shaft while affording free movement of the body axially along the shaft, and having a transverse socket generally radially into said body, said transverse socket intersecting said axial passageway and opening through the periphery of said body;
    a plunger disposed in said socket, said plunger having an outer end manually accessible from the periphery of said body, an inner end portion disposed within said body, and an axis extending between said outer end and end portions, said plunger also having a transverse through aperture which has an inner portion partially defined by threads adjacent the inner end portion of said plunger adapted for engagement with the threads of the shaft, and has an outer portion adjacent the outer end of said plunger affording free transverse movement of the plunger axially along the shaft, said plunger being movable within said socket between a released position with the outer portion of said aperture aligned with said passageway to afford axial movement of said nut assembly along the shaft, to an engaged position with the threads on said plunger engaging with the threads on the shaft; and
    biasing means between the said plunger and said body for biasing said plunger to said engaged position;
    said aperture being elongate axially of the plunger and said threads adjacent the inner end of said plunger being adapted for engagement with the threads on the shaft to lock said nut assembly against longitudinal movement on the shaft without relative rotation therebetween when said plunger is moved to said engaged position under the influence of said biasing means; and
    said body having a plurality of graduation marks about said generally cylindrical peripheral surface portion to facilitate fine rotational adjustment of the position of said nut assembly along the shaft when said plunger is in said engaged position.

4. A drill press according to claim 3 wherein said graduation marks are disposed about one end of said cylindrical peripheral surface portion.

* * * * *